3,182,037
POLYURETHANE STABILIZED WITH TITANIUM DIOXIDE AND A DITHIOCARBAMATE
George R. Nelson, Framingham, Mass., assignor to Dennison Manufacturing Company, Framingham, Mass., a corporation of Massachusetts
No Drawing. Filed June 1, 1962, Ser. No. 199,278
4 Claims. (Cl. 260—45.75)

This invention relates to polyurethane compositions and more particularly to compositions stabilized against deterioration when exposed to light, especially to light high in ultraviolet radiation.

Natural polyurethane foam is normally white in appearance when first made but tends to discolor on storage, the discoloration being accelerated by exposure to light. In a relatively short period of time, varying with the intensity of the light to which it is exposed, the naturally white foam will eventually turn from white to a dark brown. For many uses discoloration is objectionable and it is the principal object of the present invention to provide polyurethane foam compositions containing a synergistic mixture of agents which stabilize against such discoloration.

In accordance with the present invention, it has been found that polyurethane compositions can be stabilized against discoloration by the incorporation therein of a salt of a diester of dithiocarbamic acid, preferably a heavy metal or piperidinium salt, in synergistic combination with titanium dioxide. These diester salts of dithiocarbamic acid have the following formula:

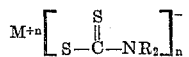

wherein $n$ is the cation valence value, R is selected from the group consisting of lower alkyl and aryl, for example phenyl, tolyl, or naphthyl, radicals, and M is a cation selected from the group consisting of piperidinium and heavy metals, for example, zinc, calcium, aluminum, tin, magnesium, nickel, lead, lanthanum, thorium, barium, manganese, and strontium. The preferred salts are zinc di-lower alkyl dithiocarbamates. With the exception of the nickel and manganese salts, the above compounds are essentially colorless. The nickel and manganese salts can be used in relatively small amounts without imparting objectionable color to the foam. By heavy metals as used herein, are meant metals other than the alkali metals.

The amount of the salt added to the polyurethane material is not critical, small amounts providing some improvement and large amounts being tolerable. However, it is preferred to employ between 0.5 and 10 parts by weight of the salt per 100 parts polymer since smaller amounts are considerably less effective while larger amounts do not give a proportionate improvement. Similarly, the amount of $TiO_2$ is not critcial, small amounts providing some benefit. About 5 parts by weight per 100 parts polymer are preferred. Larger amounts can be tolerated but do not provide increasing benefit.

While polyurethane compositions made by any of the known methods can employ the present invention, the tests reported below were made by using a commercial polyurethane prepolymer, DN–10 of the Nopco Chemical Company, understood to be the reaction adduct of polypropylene glycol, a triol, and a phosphorus containing polyol with excess toluene diisocyanate such that the prepolymer has an NCO content of 10.5%. This prepolymer was cured to polyurethane foam by adding to 100 parts by weight of prepolymer, 4.8 parts of a known catalyst mixture of triethylene diamine, water, and a 50% water emulsion of a silicone, the catalyst mixture having a weight ratio of 1 to 2 to 2, respectively. The resulting foam was heated to 210° F. for four minutes and allowed to stand overnight at room temperature. The various additives reported in the tests below were incorporated in the prepolymer prior to the addition of catalyst.

The data reported in Table I below demonstrates that $TiO_2$ alone imparts no light stability to the foam, that the organic salt alone is beneficial, and that the combination of both agents is synergistic. The percent reflectance loss is the difference in the percent reflectance, as measured with a Beckman quartz spectrophotometer, model DU at 457 mu, before and after exposure for at least ten hours per day for seven days to outdoor sunlight. A magnesium oxide block was employed as a standard at 100% reflectance.

Table I
[Materials added, parts per 100 parts prepolymer]

|  | $TiO_2$ | Percent Reflectance Loss |
|---|---|---|
| Zinc dibutyl dithiocarbamate: | | |
| 0 | 0 | 32.25 |
| 0 | 5 | 32.70 |
| 0.5 | 0 | 19.0 |
| 0.5 | 5 | 9.3 |
| 10.0 | 0 | 10.3 |
| 10.0 | 5 | 6.4 |
| Nickel dibutyl dithiocarbamate: | | |
| 1 | 5 | 1.25 |

Increasing the amount of $TiO_2$ is acceptable but without appreciable benefit as shown by the data in Table II. Here sample exposure was for seven hours at 105° F. in an Atlas Fadeometer.

Table II

| Zinc dimethyl dithiocarbamate | $TiO_2$ | Percent Reflectance Loss |
|---|---|---|
| 2.25 | 5 | 28.4 |
| 2.25 | 10 | 36.6 |
| 2.25 | 20 | 29.4 |

The beneficial effect of $TiO_2$ is not believed to be related to pigmentation, since the $TiO_2$ alone is of no benefit and the substitution of other common pigments for $TiO_2$ is detrimental. In Table III below, sample exposure was for eight hours at 105° F. in an Atlas Fadeometer.

Table III

| Zinc dimethyl dithiocarbamate | Pigment Type | Pigment Amount | Percent Reflectance Loss |
|---|---|---|---|
| 0 | | 0 | 55.5 |
| 0 | $TiO_2$ | 5 | 54.4 |
| 2.25 | | 0 | 48.4 |
| 2.25 | $TiO_2$ | 5 | 30.0 |
| 2.25 | Zinc Oxide | 5 | 60.7 |
| 2.25 | Magnesium Carbonate | 5 | 65.2 |
| 2.25 | Magnesium Oxide | 5 | 69.4 |
| 2.25 | Calcium Carbonate | 5 | 73.4 |
| 2.25 | Barium Sulfate | 5 | 77.6 |
| 2.25 | Zirconium Oxide | 5 | 60.8 |

In the foregoing examples, it is to be understood that any of the dithiocarbamate salts within the foregoing generic formula may be substituted, in whole, in part, or in admixture, for the salt specified, for example, zinc diethyl dithiocarbamate, calcium diethyl dithiocarbamate, barium diethyl dithiocarbamate, aluminum diethyl dithiocarbamate, lead diethyl dithiocarbamate, lanthanum diethyl dithiocarbamate, stannous diethyl dithiocarbamate, magnesium diethyl dithiocarbamate, and piperidinium pentamethylene dithiocarbamate. Also, the two R alkyl groups can be united to form a saturated cyclic ring as in piperidinium pentamethylene dithiocarbamate.

It should be further understood that the foregoing description is for the purpose of illustration and that the invention includes all modifications falling within the scope of the appended claims.

I claim:

1. A polyether polyurethane composition containing a synergistic mixture of titanium dioxide and a salt of a diester of dithiocarbamic acid having the general formula

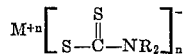

wherein M is a cation selected from the group consisting of heavy metals and piperidinium, $n$ is the cation valence value, and R is a radical selected from the group consisting of lower alkyl and aryl radicals, said mixture of materials being present in an amount effective to retard light discoloration of said polyurethane.

2. A polyurethane composition according to claim 1 wherein M is zinc, $n$ is 2, and R is lower alkyl.

3. A polyurethane composition according to claim 1 wherein M is nickel, $n$ is 2, and R is lower alkyl.

4. A polyurethane composition according to claim 1 containing about 5.0 parts by weight titanium oxide and from about 0.5 to 10.0 parts of said salt per 100 parts polyurethane polymer.

References Cited by the Examiner
UNITED STATES PATENTS
2,981,719  4/61  Mulhausen et al. _____ 260—77.5

LEON J. BERCOVITZ, *Primary Examiner.*